(12) United States Patent
Kang et al.

(10) Patent No.: US 7,767,609 B1
(45) Date of Patent: Aug. 3, 2010

(54) METHOD FOR RECOVERING REFORMING CATALYST, CATALYST AND ADSORBENT

(75) Inventors: Wen-Cheng Kang, Chiayi (TW); Hung-Tzu Chiu, Chiayi (TW); Shu-Li Wang, Chiayi (TW); Cheng-Chieh Shih, Chiayi (TW); Cheng-Tsung Hong, Chiayi (TW)

(73) Assignee: Chinese Petroleum Corporation, Taipei (TW)

( * ) Notice: Subject to any disclaimer, the term of this patent is extended or adjusted under 35 U.S.C. 154(b) by 6 days.

(21) Appl. No.: 12/321,769

(22) Filed: Jan. 26, 2009

(51) Int. Cl.
*B01J 38/56* (2006.01)
(52) U.S. Cl. ...................................................... 502/31
(58) Field of Classification Search .................. 209/172
See application file for complete search history.

(56) References Cited

U.S. PATENT DOCUMENTS 2,688,401 A * 9/1954 Schmitkons et al. ........ 209/172
5,209,840 A * 5/1993 Sherwood et al. ........... 208/210

* cited by examiner

*Primary Examiner*—Melvin C Mayes
*Assistant Examiner*—Stefanie Cohen
(74) *Attorney, Agent, or Firm*—William E. Pelton, Esq.; Cooper & Dunham LLP

(57) ABSTRACT

A method for recovering reforming catalyst comprises obtaining spent reforming catalysts; immersing the spent reforming catalysts with different degrees of aging into a light solution to obtain immersed catalysts and allowing the light solution to enter pores in the spent reforming catalysts to lower a pseudo-skeletal density of each spent reforming catalyst to obtain immersed catalysts; immersing the immersed catalysts into a heavy solution that has a density greater than pseudo-skeletal density of the immersed catalysts and replacing the light solution in the pores in the immersed catalysts by the heavy solution to increase density of the immersed catalysts; and awaiting the immersed catalysts to settle in the heavy solution to obtain settled catalysts, wherein different settling velocities due to aging creates layers of settled catalysts. Therefore, the reforming catalysts with different degrees of aging are easily classified into different layers, which can be reused for cost saving.

20 Claims, 2 Drawing Sheets

US 7,767,609 B1

METHOD FOR RECOVERING REFORMING CATALYST, CATALYST AND ADSORBENT

BACKGROUND OF THE INVENTION

1. Field of Invention

The present invention relates to a method for recovering reforming catalyst and more particularly to a method for classifying used catalysts with different degrees of aging, so reforming catalysts with a low degree of aging are collected easily to be recovered and reused.

2. Description of the Related Art

Catalytic reforming procedure is a main procedure in secondary processing of feed oil and is used to produce ingredients for gasoline, aromatic hydrocarbons and hydrogen cheaply in petroleum refineries. Catalytic reforming procedure categories include three kinds of reforming processes depending on processes for reforming catalysts, including a semi-regeneration reforming process, a continuous catalytic reforming process and a cyclic catalytic reforming process. In related industry, above processes are used in a proportion of 6:3:1. Now most new units adopt continuous catalytic reforming process.

The continuous catalytic reforming process comprises platinum (Pt)/tin (Sn) bimetallic catalysts having metallic properties and acidity. Furthermore, the continuous catalytic reforming process can be performed under an extremely low pressure (about 50 psig), which is useful for an aromatization reaction of oil and a conversion from gasoline with low octane value (such as straight-run gasoline, pyrolysis gasoline or the like) into gasoline with high octane value (such as motor gasoline, blending oils for aviation gasoline or the like) or petrified ingredients for refining benzene, toluene, xylene or the like.

Catalytic reforming procedure is performed under high temperature (490~540° C.). After the catalytic reforming procedure, an activity of reforming catalysts is decreased due to carbon deposits and an increased agglomeration of Pt/Sn. In the continuous catalytic reforming process, the reforming catalysts can be activated by a carbon burning step, oxidation step, rejuvenation step, reduction step and chloriding step to reform and activate the used catalysts and maintain original activation of the used catalysts. However, total surface area of the used catalysts will be gradually decreased as the catalysts are used multiple times, so an operational life of the catalysts will be reduced.

With reference to FIG. 1, when a total surface area of reforming catalysts is decreased due to multiple use, a chloride content and a degree of metal dispersion in the reforming catalysts also decreases, which lowers the activation of reforming catalysts. For maintaining throughput of feed oil and quality of product, reaction temperature and added amount of dichloroethane should be increased, otherwise throughput of the feed oil should be lowered to maintaining product quality. Furthermore, phase form of aluminum oxide ($Al_2O_3$) support also affects the total surface area. Generally, a surface area of $\gamma$-$Al_2O_3$ is much larger than that of $\alpha$-$Al_2O_3$, so the reaction temperature should be controlled to prevent $\gamma$-$Al_2O_3$ from converting to $\alpha$-$Al_2O_3$.

Traditionally, the amount of the total surface area of the reforming catalysts is one of indexes for changing fresh catalysts. However, when a total output value of catalytic reformers decreases because properties of the catalysts are less preferential, a lost output value is more expensive than cost of the fresh catalysts. In other words, the catalysts are replaced by fresh catalysts at an economic point when costs of lost output outweigh replacement costs.

Under theoretical conditions, catalysts in a system have a same degree of aging to allow the catalysts to have the same activity and characteristics. But units have troubles sometimes, some catalysts may be more severely aging due to unusual operation conditions such as hot spot in certain area of catalyst cycle system. Under extraordinary conditions, catalysts are severely loss, so a large amount of fresh catalysts should be supplied. Under these unusual conditions, catalysts have different degrees of aging. If all catalysts are substituted, less aged catalysts are wasted. Economic benefits of the catalytic reformers will be affected if the catalysts are not substituted correctly.

Characteristics of reforming catalysts change greatly when the reforming catalysts are converted and deactivated from the $\gamma$-form $Al_2O_3$ support to $\alpha$-form $Al_2O_3$ support, such as particle sizes of the reforming catalysts are decreased or a density of reforming catalysts is increased. Therefore, the reforming catalysts can be classified using screen or according to the density, as shown in U.S. Pat. No. 4,720,473. However, the particle sizes or the densities between reforming catalysts with different degrees aged do not present significant differences, so the reforming catalysts cannot be easily and effectively classified.

Currently, two methods for separating spent fluidized catalytic cracking catalyst include float/sink density separation (Beyerlein, R. A. et al., ACS Symposium Series 452, 109, 1990) and magnetic separation.

The more aged cracking catalyst, the more density of it. The float/sink density separation is usually used in laboratories and separates catalysts with different degrees of aging by adding used catalysts in a solution and adjusting density of the solution according to density of aged catalysts. Cracking catalyst consists of a certain amount of zeolite and a dimension of each molecule of the solution is chosen to be larger than a pore of zeolite, so molecules of the solution cannot enter into pores of the zeolite allowing the cracking catalysts to float on the solution. Therefore, the float/sink density separation is suitable for spent cracking catalyst. However, because reforming catalyst has large pores and most liquid solution is easily filled in the pores of the reforming catalyst and a solution with a density greater than the density of $\gamma$-form $Al_2O_3$ (3.97 g/cm$^3$) is not easy obtained, especially without negative effect after separation.

U.S. Pat. No. 4,406,773 and U.S. Pat. No. 5,147,527 disclosed a separation of spent cracking catalyst by using magnetic field to recover spent cracking catalyst with low vanadium (V) content and low nickel (Ni) content. This method has been put into practice. However, less metal deposits on the reforming catalyst during reforming process and the reforming catalysts with different degrees of aging have the same content of metal. Therefore, this method cannot be used for separating reforming catalysts.

To overcome the shortcomings, the present invention provides a method for recovering reforming catalyst to mitigate or obviate the aforementioned.

SUMMARY OF THE INVENTION

The primary objective of the present invention is to provide a method for classifying used catalysts with different degrees of aging, so less aged reforming catalysts are collected easily to be recovered and reused.

To achieve the objective, a method for recovering reforming catalysts in accordance with the present invention comprises obtaining spent reforming catalysts; immersing the spent reforming catalysts with different degrees of aging into a light solution to obtain immersed catalysts and allowing the light solution to enter pores in the spent reforming catalysts to lower a pseudo-skeletal density of each spent reforming catalyst to obtain immersed catalysts; immersing the immersed catalysts into a heavy solution that has a density greater than the pseudo-skeletal density of the immersed catalysts and replacing the light solution in the pores in the immersed catalysts by the heavy solution to increase pseudo-skeletal density of the immersed catalysts; and awaiting the immersed catalysts to settle in the heavy solution to obtain settled catalysts being layered due to different settling velocities.

Therefore, the reforming catalysts with different degrees of aging are easily classified into different layers, which can be reused for saving cost.

Other objectives, advantages and novel features of the invention will become more apparent from the following detailed description when taken in conjunction with the accompanying drawings.

DETAILED DESCRIPTION OF THE INVENTION

Figure 1:
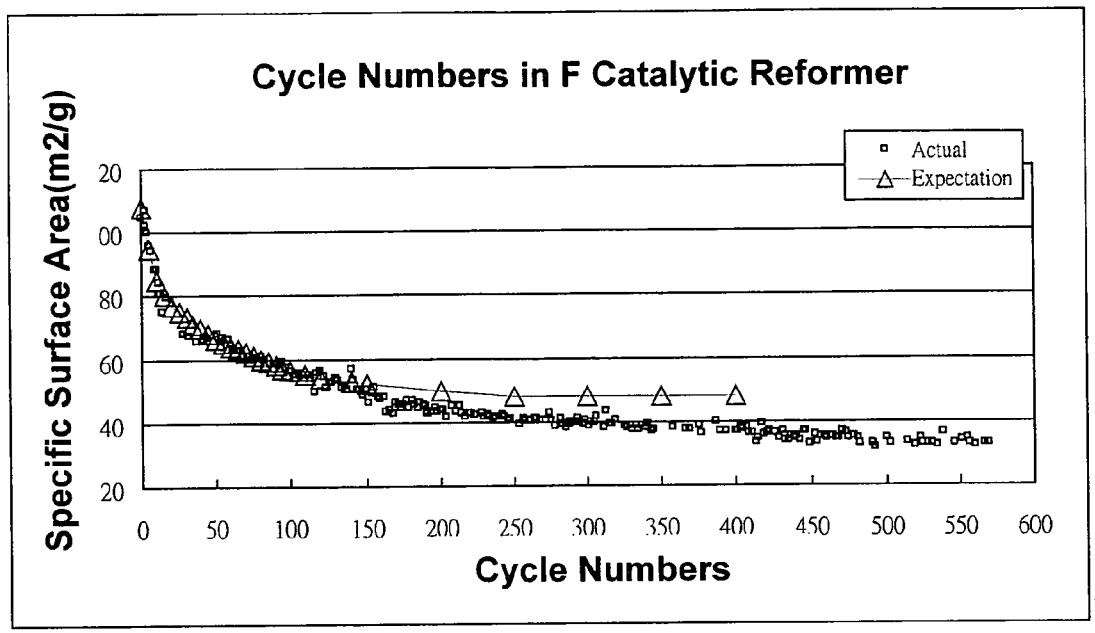
FIG. 1 is a chart of catalyst cycle numbers in an F catalytic reformer of the CPC Corporation, Taiwan.

As used herein, "a pseudo-skeletal density" indicates a ratio of weight of solid and solution in pores to volume of solid and solution in pores. The volume of solid is defined as a sum of the volume of the solid material and any closed pores within the solid. These pores cannot be penetrated with any fluid. (Principles of catalyst development by James T. Richardson 1989, p. 141)

A method for recovering reforming catalyst in accordance with the present invention comprises obtaining spent reforming catalysts, immersing the spent reforming catalysts into a light solution to obtain immersed catalysts, immersing the immersed catalysts into a heavy solution, awaiting the immersed catalysts to settle in the heavy solution to obtain settled catalysts, collecting desired settled catalysts and recycling the heavy solution.

Obtaining spent reforming catalysts may comprise burning coke deposits from surfaces of the spent reforming catalysts with an oxygen containing gas.

Immersing the spent reforming catalysts into a light solution to obtain immersed catalysts comprises immersing the spent reforming catalysts with different degrees of aging into a light solution and allowing the light solution to enter pores in the spent reforming catalysts for lowering a pseudo-skeletal density of each spent reforming catalyst to obtain immersed catalysts.

The light solution is an organic solution and has a density lower than 2.5 g/cm$^3$ and is preferably lower than 1.5 g/cm$^3$. The light solution includes, without limitation, naphtha (about 0.66~0.82 g/cm$^3$), gasoline, kerosene (about 0.78 g/cm$^3$), diesel oil (about 0.77~0.86 g/cm$^3$), hydrocarbons (such as paraffin, olefin, aromatic hydrocarbons or the like) or a mixture thereof. The light solution may have a volume equal to a total pore volume of the spent reforming catalysts.

Immersing the immersed catalysts into a heavy solution comprises immersing the immersed catalysts into a heavy solution that has a density greater than the density of the light solution and replacing the light solution in the pores in the immersed catalysts with the heavy solution to increase a pseudo-skeletal density of the immersed catalysts.

The density of the heavy solution is greater than the pseudo-skeletal density of the immersed catalysts and may be greater than 1.5 g/cm$^3$. A preferred heavy solution is halogenated hydrocarbon. Most preferably, the heavy solution includes, without limitation, tetrachloroethane (about 1.589 g/cm$^3$), tetrachloroethylene (about 1.6 g/cm$^3$), tetrabromoethane (about 2.967 g/cm$^3$), diiodomethane (about 3.32 g/cm$^3$) or a mixture thereof.

Although the ranges of the densities of the light solution and the heavy solution overlap, a person ordinarily skilled in the art is able to provide the heavy solution having a greater density than the light solution.

Awaiting the immersed catalysts to settle in the heavy solution according to different settling velocities to obtain settled catalysts, so the reforming catalysts are classified with different degrees of aging into different layers. Because severely aged reforming catalyst has a greater pseudo-skeletal density than the pseudo-skeletal density of the less aged reforming catalyst and has pores with decreased volume, the severely aged reforming catalyst adsorbs less light solution than the less aged reforming catalyst, the light solution in the pores of the severely aged reforming catalysts is replaced quickly by the heavy solution so the settling velocity of the severely aged reforming catalysts is faster than that of the less aged reforming catalysts.

Collecting desired settled catalysts may comprise first separating a desired layer or desired layers of settled catalysts from the heavy solution to obtain collected reforming catalysts, washing the collected reforming catalysts using a solvent, drying the collected reforming catalysts and calcining the collected reforming catalysts for reuse. Otherwise, collecting desired reforming catalysts may comprise separating overall settled catalysts from the heavy solution, washing the settled catalysts using a solvent, drying the settled catalysts, collecting a desired layer or desired layers of settled catalysts to obtain collected reforming catalysts and calcining the collected reforming catalysts for reuse. More preferred, collecting desired settled catalysts comprises collecting less aged reforming catalysts (in an upper layer). The solvent may be n-hexane.

Recycling the heavy solution comprises reusing the heavy solution with the light solution for further processing. After many times of recycling, recycled heavy solution has decreased density. Distillation can be used to easily separate the light solution from the heavy solution because boiling points of the light solution and of the heavy solution are greatly distinguished.

The reforming catalysts may be replaced by normal catalysts, absorbents or the like. The absorbent has pores and may be silica gel, active carbon, aluminum oxide (Al$_2$O$_3$), molecular sieves (such as zeolite molecular sieves, carbon molecular sieves or the like), natural clay or other absorbent that is known by a person ordinarily skilled in the art.

EXAMPLES

The present invention will become clearer from the following description and accompanying drawings.

Figure 2A:
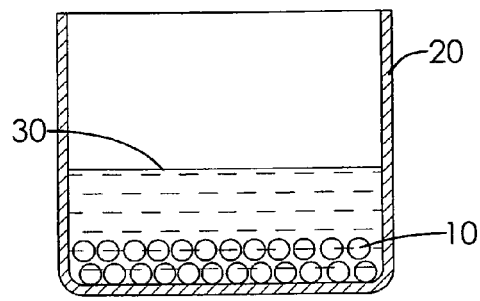
FIGS. 2A to 2D show a series of cross sectional side view of a method for recovering reforming catalyst in accordance with the present invention.
Figure 2B:
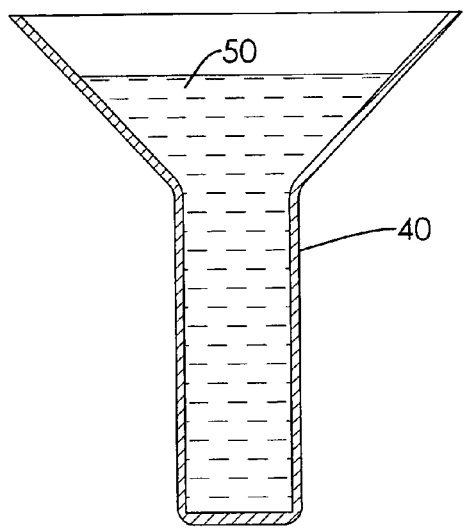
Figure 2C:
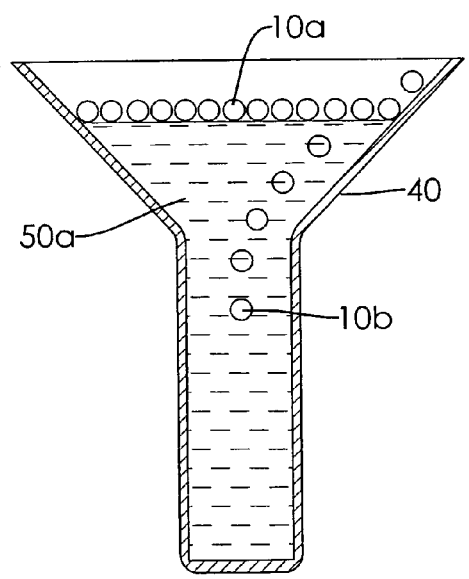

With reference to FIGS. 2A and 2C, spent reforming catalysts (10) are added into a container (20) and immersed in a light solution (30) in the container (20) to obtain immersed catalysts (10a). The volume of the light solution (30) is equal to a total pore volume of the spent reforming catalysts, therefore, no light solution remains in the container (20). The light solution (30) is diesel oil.

With reference to FIG. 2B, a heavy solution (50) that has a density greater than the pseudo-skeletal density of each immersed catalyst (10a) is filled into a funnel-shaped container (40). The heavy solution (50) is a mixture of tetrachloroethane and tetrabromoethane.

With reference to FIG. 2C, the immersed catalysts (10a) are poured into the funnel-shaped container (40). Severely aged catalysts (10b) settle to a bottom of the funnel-shaped container (40).

Figure 2D:
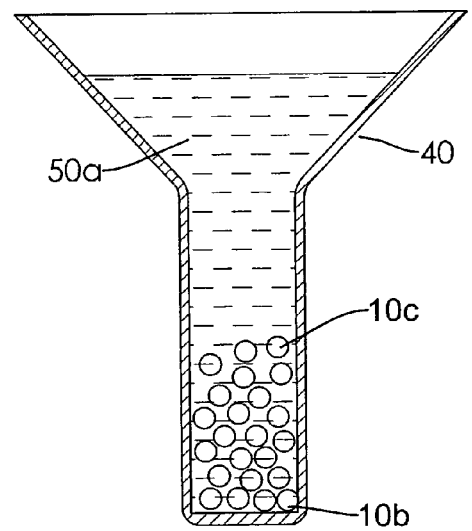

With reference to FIG. 2D, then less aged catalysts (10c) settle upon the severely aged catalysts (10b) since settling velocities of the immersed catalysts depend on the degrees of aging of the spent reforming catalysts.

A mixed solution (50a) including the light solution and the heavy solution is drained out of the funnel-shaped container (40). All reforming catalysts (10b, 10c) are washed using n-Hexane and are dried. Then, the reforming catalysts (10b, 10c) are separated to a plurality of sections and one or more of the sections are collected. The collected reforming catalysts are burned at high temperature (about higher than 450° C.) to remove solvent residue, solution residue or the like. Finally, desired reforming catalysts can be obtained.

In following examples, settled catalysts are classified into six sections, wherein the first (1st) section of catalysts include the catalysts first settled at a bottom of a funnel-shaped container and are severely aged catalysts while the sixth (6th) section of catalysts are the catalyst last to settle in the funnel-shaped container and are less aged catalysts. The examples here are only for exemplifying the present invention, a person ordinarily skilled in the art may classify the settled catalysts without limitation and may classify the settled catalysts into less than six sections or more than six sections.

Reforming catalysts used in the following examples are obtained from F catalytic reformer and S catalytic reformer of the CPC Corporation, Taiwan. The reforming catalysts in the F catalytic reformer or S catalytic reformer are all used for six years. The F catalytic reformer was operating poorly, so the reforming catalysts in the F catalytic reformer were severely damaged and a certain amount of fresh catalysts were supplied into the F catalytic reformer. The S catalytic reformer was in smooth operation, so the reforming catalysts in the S catalytic reformer were slightly damaged and fewer amounts of fresh catalysts were supplied into the S catalytic reformer.

Characteristics of fresh catalysts, the reforming catalysts in the F catalytic reformer and in the S catalytic reformer are shown in Table. 1.

TABLE 1

Characteristics of catalysts

| characteristics of catalyst | fresh catalysts | catalysts in F catalytic reformer | catalysts in S catalytic reformer |
|---|---|---|---|
| average particle size (mm) | 1.7359 | 1.6499 | 1.6746 |
| largest particle size (mm) | 2.05 | 1.83 | 1.95 |
| smallest particle size (mm) | 1.58 | 1.42 | 1.44 |
| specific surface area $(m^2/g)$* | 210.2 | 133.3 | 133.7 |
| pore volume $(m^3/g)$# | 0.75 | 0.76 | 0.76 |

*BET Surface Area
85Å~1500Å Pore Volume

Example 1

12 g of reforming catalysts from F catalytic reformer, which had been burned to remove coke deposits and were charged in a container to obtain immersed catalysts. The reforming catalysts were immersed in 9 g of n-hexadecane. A mixture of tetrachloroethane and tetrabromoethane (2.56 g/cm$^3$) were filled in a funnel-shaped container. The immersed catalysts were poured into the funnel-shaped container and immersed in the mixture. Then, most severely aged reforming catalysts firstly settled to the bottom of the funnel-shaped container and other immersed catalysts sequentially settled according to degrees of aging. After all immersed catalysts settled in the funnel-shaped container to obtain settled catalysts, all solution including the heavy solution and the light solution were drained out of the funnel-shaped container. The settled catalysts were washed by n-hexane, classified into six sections and taken out from the funnel-shaped container. The six sections of the settled catalyst were calcined and were analyzed as shown in Table 2.

TABLE 2

Characteristics of the settled catalysts after calcination in example 1

| Characteristics of catalyst | 1st | 2nd | 3rd | 4th | 5th | 6th |
|---|---|---|---|---|---|---|
| percentage of weight (%) | 9.67 | 14.60 | 11.15 | 13.95 | 19.12 | 31.51 |
| average particle size (mm) | 1.5487 | 1.6024 | 1.6213 | 1.6330 | 1.6449 | 1.7186 |
| largest particle size (mm) | 1.65 | 1.76 | 1.80 | 1.80 | 1.82 | 1.85 |
| smallest particle size (mm) | 1.34 | 1.37 | 1.42 | 1.42 | 1.41 | 1.57 |
| specific surface area $(m^2/g)$ | 118.5 | 129.1 | 128.3 | 131.1 | 136.3 | 146.7 |
| pore volume $(m^3/g)$ | 0.70 | 0.74 | 0.75 | 0.76 | 0.79 | 0.80 |

These specific surface areas (136.3 m²/g /146.7 m²/g) of the settled catalysts in the fifth section and in the sixth section (totally about 50.6 wt %) are larger than that (133.3 m²/g) of the reforming catalysts in F catalytic reformer. Particularly, there are 31.5 wt % of the settled catalysts in the sixth section and specific surface area is 146.7 m²/g. According to the curve in FIG. 1, 500 cycle numbers indicates that the reforming catalysts are used for 6 years and 150 cycle numbers indicates that the reforming catalysts are used for less than 2 years. Therefore, 50.6 wt % of the settled catalysts in the fifth section and the sixth section were recovered from about 500 cycle numbers to about 170 cycle numbers, i.e. activity of the settled catalysts in the fifth section and the sixth section were recovered.

Example 2

The method of Example 1 was repeated with 12 g of reforming catalysts from F catalytic reformer which had not been burned so comprised coke deposits absorbed on the surface of the reforming catalysts. The six sections of the settled catalyst were calcined and were analyzed as shown in Table 3.

TABLE 3

Characteristics of the settled catalysts after calcination in Example 2

| Characteristics of catalyst | 1st | 2nd | 3rd | 4th | 5th | 6th |
|---|---|---|---|---|---|---|
| percentage of weight (%) | 7.20 | 9.20 | 10.40 | 13.40 | 16.8 | 43.10 |
| average particle size (mm) | 1.4791 | 1.5880 | 1.5942 | 1.6125 | 1.6586 | 1.6983 |
| largest particle size (mm) | 1.68 | 1.72 | 1.77 | 1.78 | 1.83 | 1.87 |
| smallest particle size (mm) | 1.21 | 1.46 | 1.41 | 1.40 | 1.43 | 1.51 |
| specific surface area (m²/g) | 100.2 | 125.0 | 129.5 | 128.8 | 127.5 | 145.3 |
| pore volume (m³/g) | 0.60 | 0.74 | 0.75 | 0.76 | 0.73 | 0.80 |

There are 43.1 wt % of the settled catalysts in the sixth section and specific surface area of the settled catalysts is 145.3 m²/g. According to the curve in FIG. 1, the settled catalysts in the sixth section were recovered from about 500 cycle numbers to less than 150 cycle numbers and the activity of the settled catalysts in the sixth section were recovered.

Therefore, regarding examples 1 and 2, almost half of the reforming catalysts in the F catalytic reformer can be recovered and reused no matter whether coke deposits were removed or not.

Example 3

The method of Example 1 was further applied to 12 g of reforming catalysts obtained from S catalytic reformer. The six sections of the settled catalyst were calcined and analyzed as shown in Table 4.

TABLE 4

Characteristics of the settled catalysts after calcination in Example 3

| characteristics of catalyst | 1st | 2nd | 3rd | 4th | 5th | 6th |
|---|---|---|---|---|---|---|
| percentage of weight (%) | 8.48 | 10.57 | 12.56 | 9.85 | 14.91 | 43.63 |
| average particle size (mm) | 1.6025 | 1.6348 | 1.6390 | 1.6418 | 1.6627 | 1.6910 |
| largest particle size (mm) | 1.78 | 1.77 | 1.77 | 1.80 | 1.83 | 1.93 |
| smallest particle size (mm) | 1.35 | 1.45 | 1.52 | 1.44 | 1.49 | 1.55 |
| specific surface area (m²/g) | 132.7 | 132.3 | 135.3 | 133.9 | 134.6 | 139.4 |
| pore volume (m³/g) | 0.72 | 0.75 | 0.77 | 0.77 | 0.77 | 0.79 |

The specific surface area (139.4 m²/g) of the settled catalysts in the sixth section (totally about 43.63 wt %) is larger than that (133.7 m²/g) of the reforming catalysts in S catalytic reformer. Therefore, the settled catalysts in the S catalytic reformer were recovered using the present invention, but recovering efficiency in S catalytic reformer is less than that in F catalytic reformer. Because the S catalytic reformer was in smooth operation and fewer reforming catalysts were damaged and lost, there are a fewer differences between the settled catalysts in six sections.

Example 4

The method of Example 2, was applied to 12 g of unburned reforming catalysts obtained from S catalytic reformer. The six sections of the settled catalyst were calcined and were analyzed as shown in Table 5.

TABLE 5

Characteristics of the settled catalysts after calcination in Example 4

| characteristics of catalyst | 1st | 2nd | 3rd | 4th | 5th | 6th |
| --- | --- | --- | --- | --- | --- | --- |
| percentage of weight (%) | 7.39 | 9.63 | 13.06 | 10.04 | 10.92 | 48.95 |
| average particle size (mm) | 1.5994 | 1.6338 | 1.6507 | 1.6535 | 1.6749 | 1.6831 |
| largest particle size (mm) | 1.80 | 1.79 | 1.83 | 1.84 | 1.83 | 1.84 |
| smallest particle size (mm) | 1.43 | 1.42 | 1.41 | 1.43 | 1.56 | 1.50 |
| specific surface area (m²/g) | 130.6 | 134.1 | 130.7 | 136.2 | 133.7 | 136.3 |
| pore volume (m³/g) | 0.75 | 0.77 | 0.76 | 0.79 | 0.78 | 0.80 |

There are 58.23 wt % of the settled catalysts in the fifth section and the sixth section. Particularly, the specific surface area of the settled catalysts in the sixth section is 136.3 m²/g while the specific surface area of the reforming catalysts is 133.7 m²/g. Therefore, the settled catalysts in example 4 were recovered, but recovering efficiency in example 4 is less than that in example 3. It is proved that after the reforming catalysts were burned to remove the coke deposits, the settled catalysts can be separated more efficiently.

According to the above examples, the method of the present invention can be used for classifying the reforming catalysts. Furthermore, if the reforming catalysts have no coke deposits absorbed on surface of the reforming catalysts, the reforming catalysts can be separated efficiently. The method of the present invention is easy to recovery the less aged reforming catalysts and lower catalyst costs of catalytic reformer.

Even though numerous characteristics and advantages of the present invention have been set forth in the foregoing description, together with details of the structure and function of the invention, the disclosure is illustrative only. Changes may be made in detail, especially in matters of shape, size and arrangement of parts within the principles of the invention to the full extent indicated by the broad general meaning of the terms in which the appended claims are expressed.

What is claimed is:

1. A method for recovering reforming catalyst comprising:
    obtaining spent reforming catalysts;
    immersing the spent reforming catalysts with different degrees of aging into a light solution to obtain immersed catalysts allowing the light solution to enter pores in the spent reforming catalysts;
    immersing the immersed catalysts into a heavy solution having a density greater than the light solution and replacing the light solution in pores in the immersed catalysts with the heavy solution to increase a pseudo-skeletal density of the immersed catalysts, so that the light solution is removed from the pores of the immersed catalysts; and
    allowing the immersed catalysts to settle in the heavy solution to obtain settled catalysts having allowed the immersed catalysts to have different settling velocities to obtain settled catalysts, so that the reforming catalysts with different degrees of aging are layered and classified into distinct layers and less aged reforming catalyst is settled directly upon severely aged reforming catalyst.

2. The method for recovering reforming catalyst as claimed in claim 1, wherein the step of obtaining spent reforming catalysts includes burning coke deposits from surfaces of the spent reforming catalysts.

3. The method for recovering reforming catalyst as claimed in claim 2, wherein the light solution has a density lower than 2.5 g/cm³ and the density of the heavy solution is greater than 1.5 g/cm³.

4. The method for recovering reforming catalyst as claimed in claim 2, wherein the light solution has a density lower than 1.5 g/cm³ and the density of the heavy solution is greater than 1.5 g/cm³.

5. The method for recovering reforming catalyst as claimed in claim 2, wherein
    the light solution is selected from the group consisting of naphtha, gasoline, kerosene, diesel oil, hydrocarbons and a mixture thereof; and hydrocarbons are selected from the group consisting of paraffin, olefin, aromatic hydrocarbons and a mixture thereof;
    the heavy solution is halogenated hydrocarbon that is selected from the group consisting of tetrachloroethane, tetrachloroethylene, tetrabromoethane, diiodomethane and a mixture thereof.

6. The method for recovering reforming catalyst as claimed in claim 2, wherein the light solution has a volume equal to a total pore volume of the spent reforming catalysts.

7. The method for recovering reforming catalyst as claimed in claim 2, wherein the density of the heavy solution is greater than the pseudo-skeletal density of the immersed catalysts.

8. The method for recovering reforming catalyst as claimed in claim 1, further comprising
    collecting desired settled catalysts after the settled catalysts are obtained; and
    recycling the heavy solution after collecting desired settled catalysts, wherein the heavy solution contains the light solution from previous steps.

9. The method for recovering reforming catalyst as claimed in claim 8, wherein collecting desired settled catalysts comprises separating a desired layer or desired layers of settled catalysts from the heavy solution to obtain collected reforming catalysts;

washing the collected reforming catalysts using a solvent;

drying the collected reforming catalysts; and calcining the collected reforming catalysts for reuse.

10. The method for recovering reforming catalyst as claimed in claim 8, wherein collecting desired settled catalysts comprises separating overall settled catalysts from the heavy solution;

washing the settled catalysts using a solvent;

drying the settled catalysts;

collecting a desired layer or desired layers of settled catalysts to obtain collected reforming catalysts; and calcining the collected reforming catalysts for reuse.

11. A method for recovering catalyst comprising:

obtaining spent catalysts;

immersing the spent catalysts with different degrees of aging into a light solution to obtain immersed catalysts allowing the light solution to enter pores in the spent reforming catalysts;

immersing the immersed catalysts into a heavy solution having a density greater than the light solution and replacing the light solution in pores in the immersed catalysts with the heavy solution to increase a pseudo-skeletal density of the immersed catalysts, so that the light solution is removed from the pores of the immersed catalysts; and allowing the immersed catalysts to settle in the heavy solution to obtain settled catalysts having allowed the immersed catalysts to have different settling velocities to obtain settled catalysts, so that the catalysts with different degrees of aging are layered and classified into distinct layers and less aged reforming catalyst is settled directly upon severely aged reforming catalyst.

12. The method for recovering catalyst as claimed in claim 11, wherein the light solution has a density lower than 2.5 g/cm$^3$ and the density of the heavy solution is greater than 1.5 g/cm$^3$.

13. The method for recovering catalyst as claimed in claim 11, wherein the light solution has a density lower than 1.5 g/cm$^3$ and the density of the heavy solution is greater than 1.5 g/cm$^3$.

14. The method for recovering catalyst as claimed in claim 11, wherein the light solution is selected from the group consisting of naphtha, gasoline, kerosene, diesel oil, hydrocarbons and a mixture thereof; and hydrocarbons are selected from the group consisting of paraffin, olefin, aromatic hydrocarbons and a mixture thereof;

the heavy solution is halogenated hydrocarbon that is selected from the group consisting of tetrachloroethane, tetrachloroethylene, tetrabromoethane, diiodomethane and a mixture thereof.

15. The method for recovering catalyst as claimed in claim 11, wherein the light solution has a volume equal to a total pore volume of the spent catalysts; and the density of the heavy solution is greater than the pseudo-skeletal density of the immersed catalysts.

16. A method for recovering adsorbent comprising:

obtaining spent adsorbents;

immersing the spent adsorbents with different degrees of aging into a light solution to obtain immersed adsorbents allowing the light solution to enter pores in the spent reforming catalysts;

immersing the immersed adsorbents into a heavy solution having a density greater than the light solution and replacing the light solution in pores in the immersed adsorbents with the heavy solution to increase a pseudo-skeletal density of the immersed adsorbents so that the light solution is removed from the pores of the immersed adsorbents; and allowing the immersed adsorbents to settle in the heavy solution to obtain settled adsorbents having allowed the immersed adsorbents to have different settling velocities to obtain settled adsorbents, so that the adsorbents with different degrees of aging are layered and classified into distinct layers and less aged adsorbent is settled directly upon severely aged adsorbent.

17. The method for recovering adsorbent as claimed in claim 16, wherein the light solution has a density lower than 2.5 g/cm$^3$ and the density of the heavy solution is greater than 1.5 g/cm$^3$.

18. The method for recovering adsorbent as claimed in claim 16, wherein the light solution has a density lower than 1.5 g/cm$^3$ and the density of the heavy solution is greater than 1.5 g/cm$^3$.

19. The method for recovering adsorbent as claimed in claim 16, wherein the light solution is selected from the group consisting of naphtha, gasoline, kerosene, diesel oil, hydrocarbons and a mixture thereof; and hydrocarbons are selected from the group consisting of paraffin, olefin, aromatic hydrocarbons and a mixture thereof;

the heavy solution is halogenated hydrocarbon that is selected from the group consisting of tetrachloroethane, tetrachloroethylene, tetrabromoethane, diiodomethane and a mixture thereof.

20. The method for recovering adsorbent as claimed in claim 16, wherein the light solution has a volume equal to a total pore volume of the spent adsorbents; and the density of the heavy solution is greater than the pseudo-skeletal density of the immersed adsorbents.

* * * * *